(12) United States Patent
Barnholt

(10) Patent No.: US 11,441,615 B2
(45) Date of Patent: Sep. 13, 2022

(54) CLUTCH ADJUSTMENT SYSTEM WITH WEAR RESISTANT FEATURES FOR BACK DRIVING PREVENTION

(71) Applicant: EATON INTELLIGENT POWER LIMITED, Dublin (IE)

(72) Inventor: Mark Charles Barnholt, Fort Wayne, IN (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/275,869

(22) PCT Filed: Sep. 13, 2019

(86) PCT No.: PCT/EP2019/074479
§ 371 (c)(1),
(2) Date: Mar. 12, 2021

(87) PCT Pub. No.: WO2020/053385
PCT Pub. Date: Mar. 19, 2020

(65) Prior Publication Data
US 2022/0056962 A1 Feb. 24, 2022

Related U.S. Application Data

(60) Provisional application No. 62/730,820, filed on Sep. 13, 2018.

(51) Int. Cl.
*F16D 13/75* (2006.01)
(52) U.S. Cl.
CPC ................. *F16D 13/757* (2013.01)
(58) Field of Classification Search
USPC ...................................................... 192/111.2
See application file for complete search history.

(56) References Cited

U.S. PATENT DOCUMENTS 5,069,322 A * 12/1991 Mizukami ............... F16D 13/71
192/111.2
5,887,689 A 3/1999 Young
(Continued)

FOREIGN PATENT DOCUMENTS

GB 2317207 A 3/1998
JP 2016098995 A * 5/2016 ............. F16D 13/52

OTHER PUBLICATIONS

International Search Report and Written opinion dated Nov. 26, 2019 pertaining to PCT Application No. PCT/EP2019/074479 filed Sep. 13, 2019.

*Primary Examiner* — Timothy Hannon
(74) *Attorney, Agent, or Firm* — Merchant & Gould P.C.

(57) ABSTRACT

A friction clutch for a motor vehicle includes an adjustment mechanism compensating for wear of a friction disk. The adjustment mechanism (40) includes a first cam ring (52) rotatably fixed and a second cam ring (54) rotatable relative to the first cam ring (52). Both cam rings (52,54) have a plurality of cam surfaces configured such that rotation of the second cam ring (54) relative to the first cam ring (52) varies a height of the adjustment mechanism (40). A torsion spring (60) applies a biasing force to the second cam ring (54). A back drive prevention assembly (70) includes a back drive spring (80) attached to the pressure plate and first cam ring (52) to prevent back drive of the second cam ring (54) through a baffle (62) including a plurality of cam teeth (72) formed on a bottom surface of the baffle (62). The cam teeth (72) are formed at an angle A relative to a bottom surface of the baffle (62) decreasing displacement and loads of the back drive spring (80).

11 Claims, 9 Drawing Sheets

(56) References Cited

U.S. PATENT DOCUMENTS

| | | | |
|---|---|---|---|
| 6,460,676 B1 | 10/2002 | Young | |
| 6,923,304 B2 * | 8/2005 | Lindner | F16D 13/757 192/111.2 |
| 2013/0092500 A1 | 4/2013 | Wakabayashi | |

* cited by examiner

CLUTCH ADJUSTMENT SYSTEM WITH WEAR RESISTANT FEATURES FOR BACK DRIVING PREVENTION

FIELD OF THE INVENTION

The invention relates to a self-adjust friction clutch.

BACKGROUND OF THE INVENTION

Dry friction clutches may be utilized for selective engagement of an engine with an input shaft of a transmission. Generally, dry clutches have a cover that is spaced from and connected with an engine flywheel. Inside the cover is a pressure plate that is connected to the cover and is axially moveable towards the flywheel. Positioned between pressure plate and flywheel is a friction disc. The friction disc is connected with an input shaft of a transmission. As the friction lining of the friction disc wears, adjustment is required to maintain diaphragm spring finger height. To provide for adjustment, clutches may include a multiple cam ring adjuster between the apply spring and the pressure plate. Adjustment mechanisms may include a first cam ring that is fixed that engages a second rotational ring. A spring may be provided to urge the second cam ring to rotate with respect to the first cam ring. As the second cam ring rotates, the distance between the apply spring and an extreme end of the pressure plate increases to compensate for the friction plate wear.

Variable forces may be applied to the friction clutch that may lead to back driving of the cam surfaces which in turn may vary a position of the diaphragm spring fingers used to actuate the friction disk. There is therefore a need in the art for an improved adjustment mechanism that reduces back drive of the cam surfaces and cam members. There is also a need in the art for an adjustment mechanism that is wear resistant, easy to assemble and provides a cost effective and reliable mechanism.

SUMMARY OF THE INVENTION

In one aspect, there is disclosed a friction clutch for a motor vehicle coupling an engine flywheel to a transmission including an adjustment mechanism compensating for wear of a friction disk coupling the engine flywheel and transmission. The adjustment mechanism includes a first cam ring rotatably fixed with respect to a pressure plate and a second cam ring rotatable relative to the first cam ring. The first cam can be integral to the pressure plate. Both cam rings have a plurality of cam surfaces configured such that rotation of the second cam ring relative to the first cam ring varies a height of the adjustment mechanism. A torsion spring applies a biasing force to the second cam ring promoting rotation of the second cam ring relative to the first cam ring. A back drive prevention assembly includes a back drive spring attached to the rotatably fixed pressure plate while engaging the second cam ring and a baffle through a plurality of cam teeth formed on a bottom surface of the baffle. The cam teeth are formed at an angle A relative to a bottom surface of the baffle from a proximal end of the cam teeth to a distal end of the cam teeth decreasing a load applied to the back drive spring and reducing displacement of the back drive spring.

In another aspect, there is disclosed a friction clutch for a motor vehicle coupling an engine flywheel to a transmission including an adjustment mechanism compensating for wear of a friction disk coupling the engine flywheel and transmission. The adjustment mechanism includes a first cam ring rotatably fixed with respect to a pressure plate and a second cam ring rotatable relative to the first cam ring. The first cam can be integral to the pressure plate. Both cam rings have a plurality of cam surfaces configured such that rotation of the second cam ring relative to the first cam ring varies a height of the adjustment mechanism. A torsion spring applies a biasing force to the second cam ring promoting rotation of the second cam ring relative to the first cam ring. A back drive prevention assembly includes a back drive spring attached to the rotatably fixed pressure plate while engaging the second cam ring and a baffle through a plurality of cam teeth formed on a bottom surface of the baffle. The cam teeth are formed at an angle A of from 2.0 to 6.0 degrees relative to a bottom surface of the baffle from a proximal end of the cam teeth to a distal end of the cam teeth decreasing a load applied to the back drive spring and reducing displacement of the back drive spring.

BRIEF DESCRIPTION OF THE D WINGS

DETAILED DESCRIPTION OF THE PREFERRED EMBODIMENTS

Figure 1:
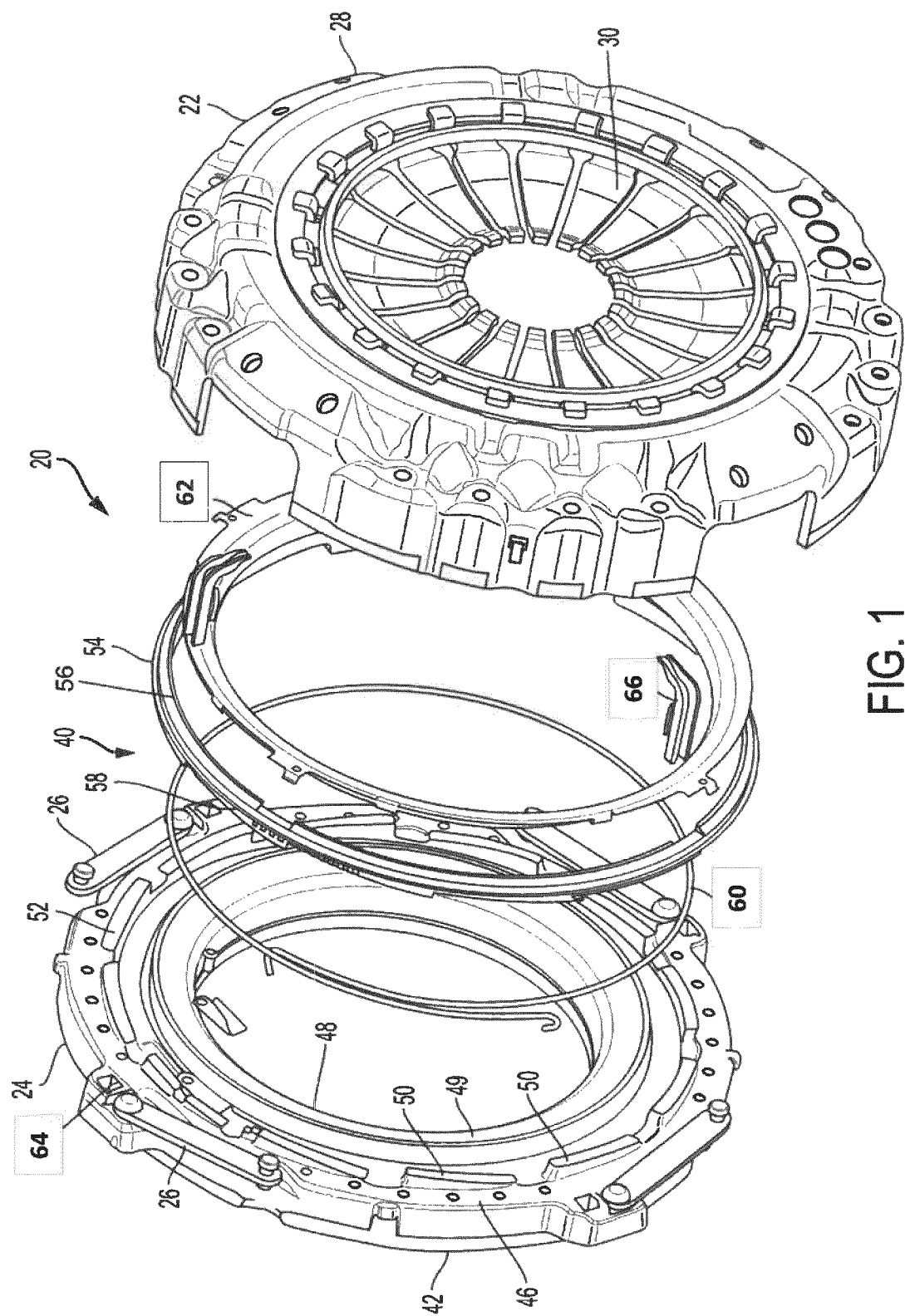
FIG. 1 is an exploded perspective view of a friction clutch assembly.
Figure 2:
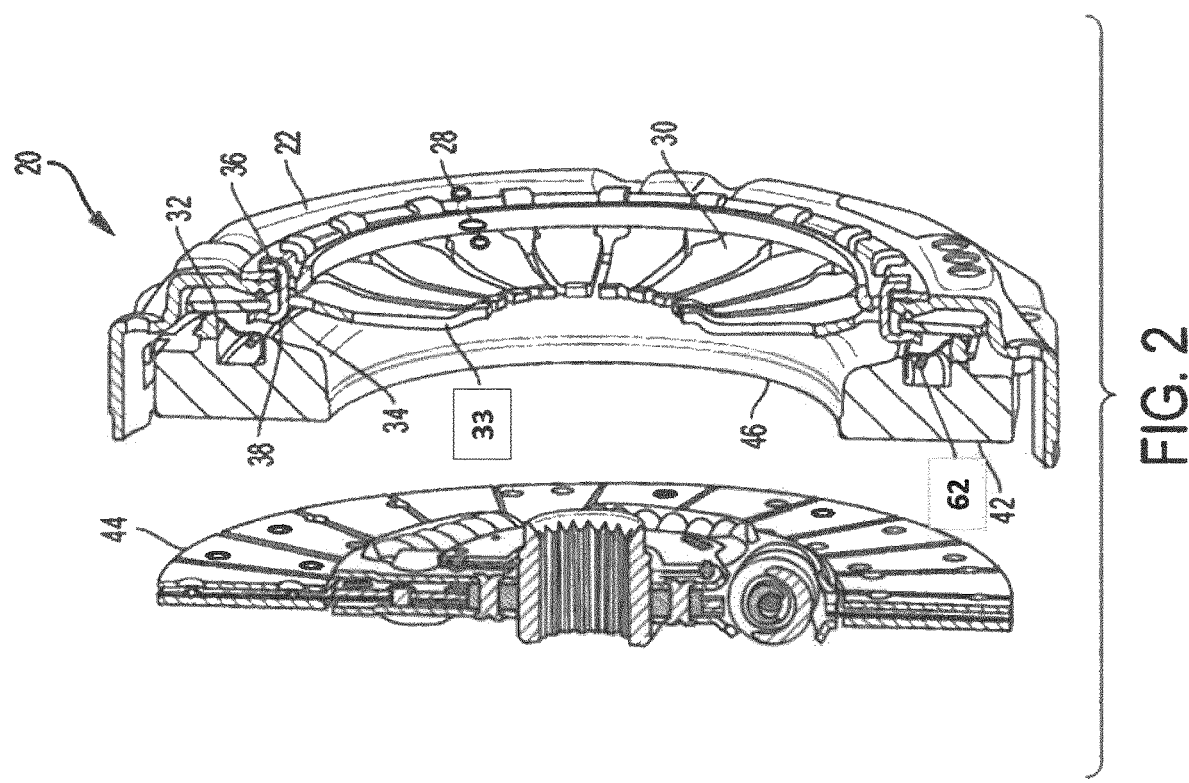
FIG. 2 is a partial cut away section of a friction clutch assembly.

Referring to FIGS. 1-2, there is shown a dry friction clutch assembly 20. The dry friction clutch assembly 20 includes a cover assembly 22 that is torsionally coupled to a flywheel of an engine (not shown). The cover assembly 22 is torsionally coupled to a pressure plate 24 by spring straps 26.

The cover assembly 22 includes a housing 28 and a diaphragm spring 30 positioned therein. The diaphragm spring 30 is a disc-shaped Belleville spring having a continuous solid outer rim portion 32. Projecting radially inward from the rim 32 is a series of diaphragm spring fingers 33. Holding the diaphragm spring 30 in position is a lower fulcrum ring 34. The lower fulcrum ring 34 includes an arm 36 that passes through slots in the housing 28 and a ring 38 that is attached to the arms 36. The ring 38 applies an upward force to load the diaphragm spring 30 and maintain it in position. The rim 32 of the diaphragm spring 30 pushes downward on the pressure plate 24 through an adjustment assembly 40 as will be described in more detail below.

The pressure plate 24 has a flat annular surface 42 for engagement with a friction disc 44. The pressure plate 24 also includes an opposing surface 46, having an annular groove 48. The annular groove 48 has a radial inner wall 49. An outer perimeter of the annular groove 48 includes a plurality of ramps 50 which defines an integral first cam ring 52.

The pressure plate 24 is axially movable with respect to the housing 28. The clamping movement of the pressure plate 24 is induced by the clamping load of the diaphragm spring 30 causing the pressure plate 24 to engage with the friction disc 44. The friction disc 44 is engaged with the flywheel to torsionally connect the engine with the input shaft of the transmission. In the normal state of operation, the clutch assembly 20 engages the transmission with the engine unless the clutch is released.

To torsionally disconnect the transmission from the engine, a shift fork's release bearing (not shown) contacts the fingers 33 causing the diaphragm spring 30 to elastically deform causing the rim 32 to pivot away from the pressure plate 24 allowing the pressure plate 24 to disengage from the friction disc 44.

The adjustment assembly 40 is positioned between the pressure plate 24 and the diaphragm spring 30. The adjustment assembly 40 allows the clutch 20 to compensate for wear of the friction disc 44. The adjustment assembly 40 includes the first cam ring 52. Engaged with the first cam 52 is a second cam ring 54. The second cam ring 54 includes an upper extension to transfer the clamping load from the diaphragm spring 30 to the pressure plate 24. A bottom portion of the second cam ring 54 includes a plurality of ramps 58 for engagement with the first cam ring 52. Rotation of the second cam ring 54 with respect to the first cam ring 52 increases the distance between the diaphragm spring 30 and the pressure plate 24 compensating for wear that reduces the thickness of the friction disc 44.

Referring to FIG. 1, the adjustment assembly 40 also includes a torsion spring 60. The torsion spring 60 biases the second cam ring 54 to rotate relative to the first cam ring 52. Due to the forces applied to the clutch assembly 20, back drive of the second cam ring 54 relative to the first cam ring 52 may occur.

Again referring to FIGS. 1-2 a baffle 62 is connected with the second cam ring 54. The baffle 62 environmentally protects torsion spring 60 from dirt and other debris. The baffle 62 engages with the second cam ring 54 for a simple installation. The adjustment assembly 40 pilots within the radial inner wall 49.

Positioned within apertures 64 formed in the pressure plate 24 are control fingers 66. Control fingers 66 contact with the engine flywheel and are also positioned adjacent to a radial rim of the second cam ring 54. The control finger 66 will prevent rotation of the second cam ring 54 with respect to the first cam ring 52 unless adjustment is appropriate.

Figure 3:
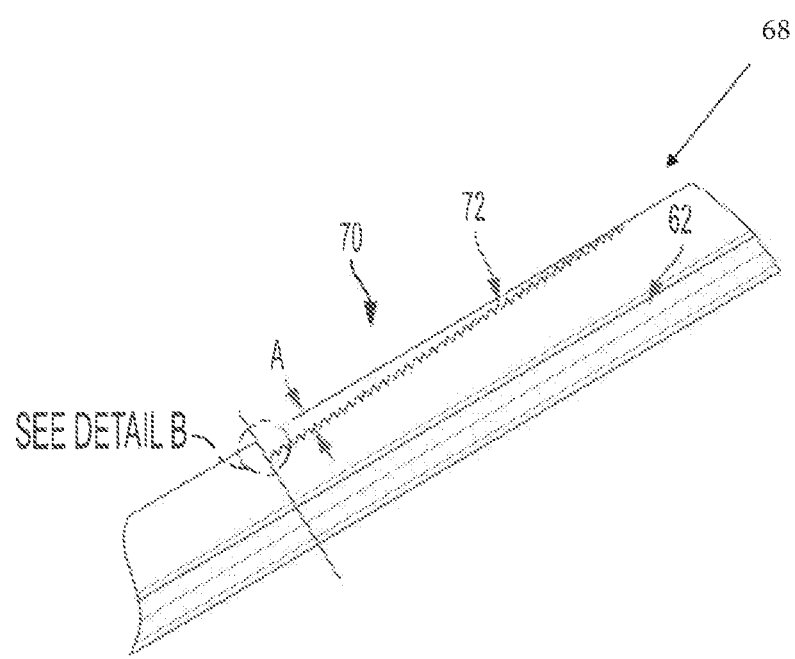
FIG. 3 is a partial perspective view of a portion of a friction clutch including a baffle and back drive spring.
Figure 4:
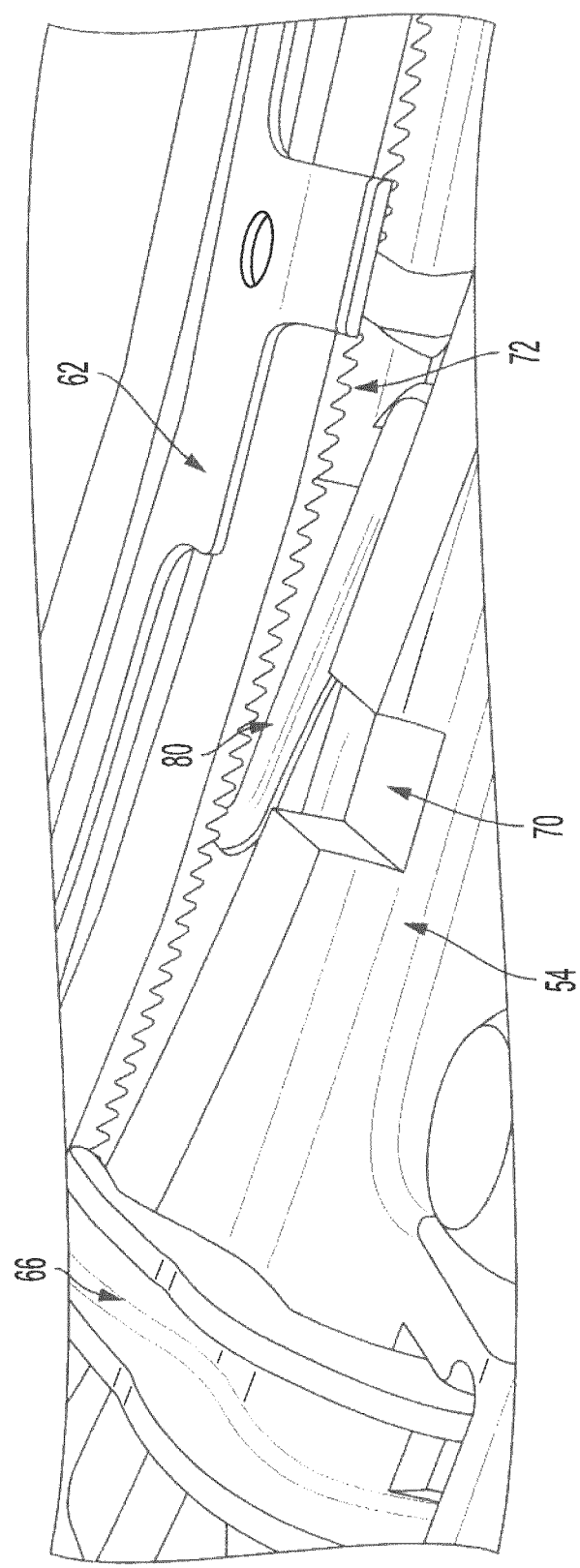
FIG. 4 is a partial side view of a portion of a friction clutch including baffle with angled teeth.
Figure 5:
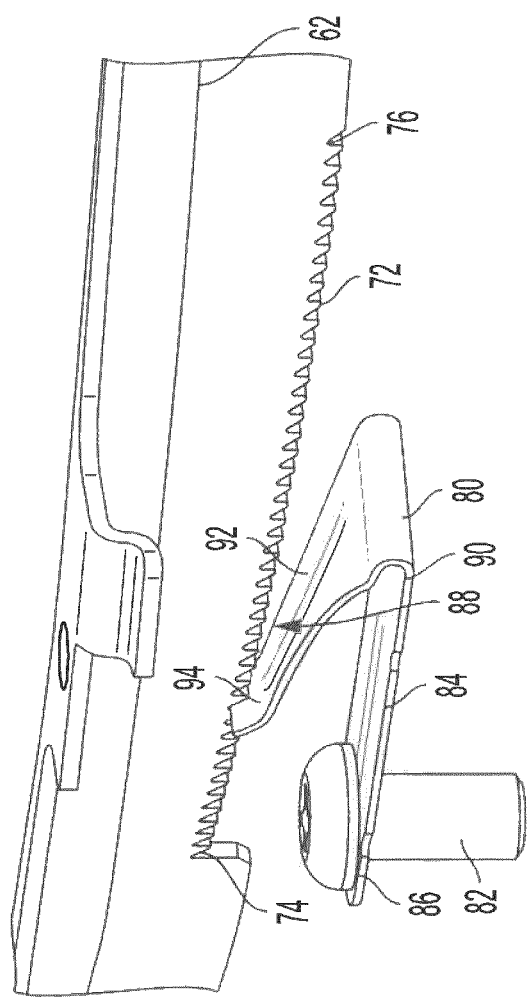
FIG. 5 is a partial perspective view of a portion of a friction clutch assembly excluding the second cam ring to enable viewing the back drive prevention assembly.

Referring to FIGS. 3-5 there is shown a partial view of the baffle 62 having a back drive prevention assembly 70. The back drive prevention assembly 70 includes a plurality of cam teeth 72 formed on the bottom surface 68 of baffle 62. In one aspect, the cam teeth 72 may be formed on at least one portion of the baffle 62 or at multiple locations on the baffle 62. For example, the cam teeth 72 may be formed at locations radially about the bottom surface 68 of the baffle 62. The cam teeth 72 may extend from 20 to 40 degrees on the diameter at the various locations. The cam teeth 72 may be formed by stamping, milling, or casting the teeth onto the baffle 62.

In one aspect the cam teeth 72 may be formed at an angle A from a proximal end 74 of the cam teeth 72 to a distal end 76 of the cam teeth 72, as best shown in FIGS. 4 and 5. The angle A may be selected so that it matches an angle of the ramps 50, 58 described above on the first and second cam rings 52, 54 or may include a differing angle. In one aspect the angle A may be from 2.0 to 6.0 degrees.

Referring to FIGS. 3-5, the cam teeth 72 engage a back drive spring 80 that is attached to the second cam ring 54. The back drive spring 80 may be positioned about a fastener 82 that attaches to the rotatably fixed pressure plate 24 and first cam 52 while preventing back drive of the baffle 62 and second cam ring 54. The angled cam teeth 72 accommodate wear of the friction disk 44 and maintains a deflection of the back drive spring 80, as will be discussed in more detail below.

The back drive spring 80 includes a base portion 84 having a slot 86 formed therein. The slot 86 receives the fastener 82 as described above. The base 80 may be positioned within the pressure plate 24 and first cam 52 while preventing back drive of the baffle 62 and second cam ring 54. The back drive spring 80 further includes a teeth engaging arm 88 that is positioned to engage the cam teeth 72 and is angled relative to the base defining a pivot and prevent back-driving of the second cam ring 54. The teeth engaging arm 88 may extend from the base 80 at a side surface 90 of the base 84 and extend along a medial portion 92 to an engagement end 94 that engages the cam teeth 72.

In use, diaphragm spring 30 applies a force to the second cam ring 54 which in turn forces downwardly upon the first cam ring 52 integral with the pressure plate 24 to cause the pressure plate 24 to clamp downward on the friction disc 44 against the flywheel of the engine coupling the engine with the transmission input shaft of a vehicle. To decouple the transmission from the engine, a push type release fork and release bearing (not shown) is utilized to push the leaves (fingers) 33 of the diaphragm spring 30 towards the pressure plate 24 decoupling the clutch. A return of the release fork couples the transmission with the engine.

If the friction disc 44 is not sufficiently worn, no adjustment can occur as the control fingers 66 engage with second cam ring 54 preventing adjustment. Upon sufficient wear of the friction disc 44, relative movement of the pressure plate 24 with respect to the control fingers 66 will occur forming an adjustment gap. Upon the next release of the pressure plate 24 from the frictional disc 44, second cam ring 54 will rotate relative to the first cam ring 52 in response to the biasing force of the torsion spring 60 adjusting the second cam ring 54 to compensate for a reduced thickness of the friction disc 44.

The back drive prevention assembly 70 maintains the second cam ring 54 relative to the first cam ring 52 and maintains a position of the diaphragm spring 30. As the thickness of the friction disk 44 changes the back drive spring 80 changes contact with the cam teeth 72.

For example, when the friction disc 44 is not worn the back drive spring 80 contacts the cam teeth 72 at the proximal end 74 of the cam teeth 72. When the friction disk 44 is worn the back drive spring 80 contacts the cam teeth 72 at the distal end 76 of the cam teeth 72. Repeated movement of the back drive spring 80 relative to the cam teeth 72 due to engine vibration may cause wear.

Further the load applied by the back drive spring 80 to the cam teeth 72 is decreased as the deflection of the back drive spring 80 is nearly fixed over the range of the friction disk wear, due to the angled cam teeth 72 as described above.

EXAMPLES

Figure 6A:
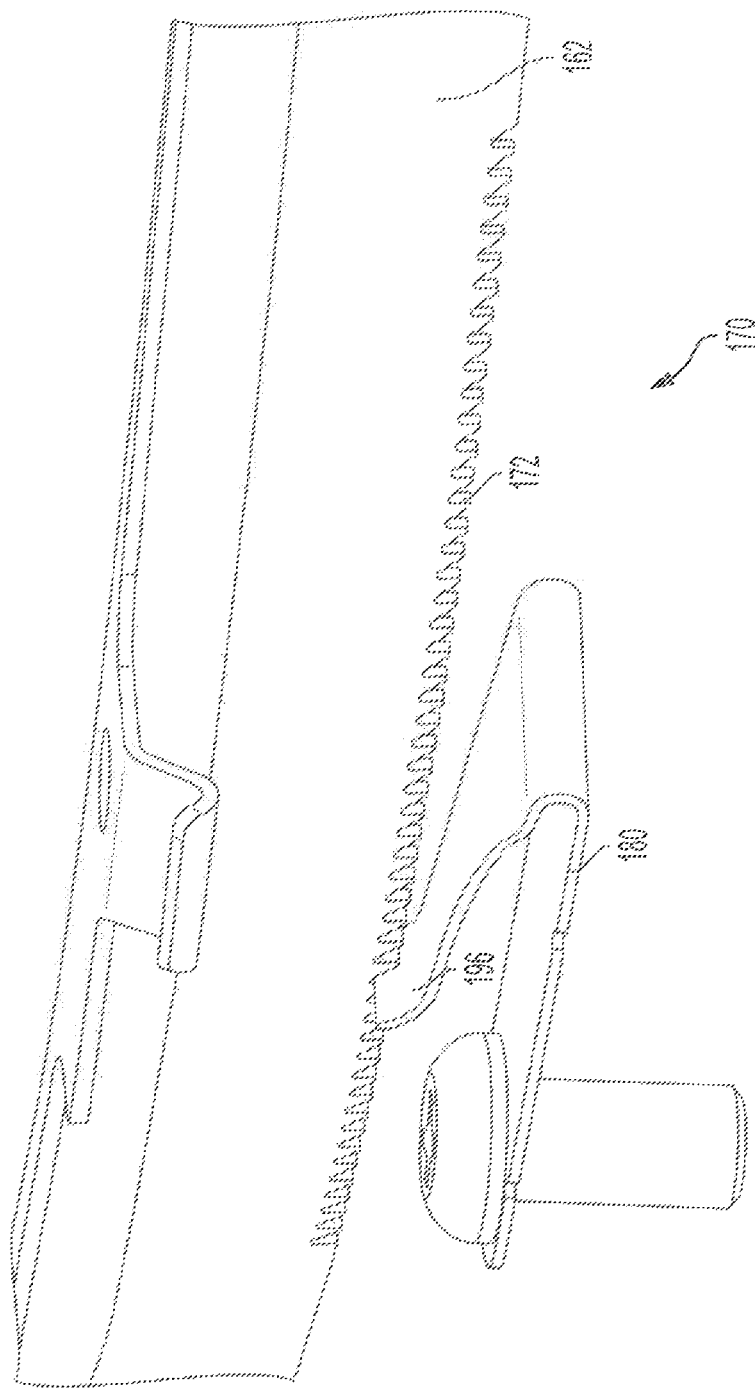
FIG. 6A is a partial perspective view of a prior art friction clutch including a baffle and back drive spring and FIG. 6B is a diagram indicating load and displacement of the prior art back drive spring.
Figure 6B:
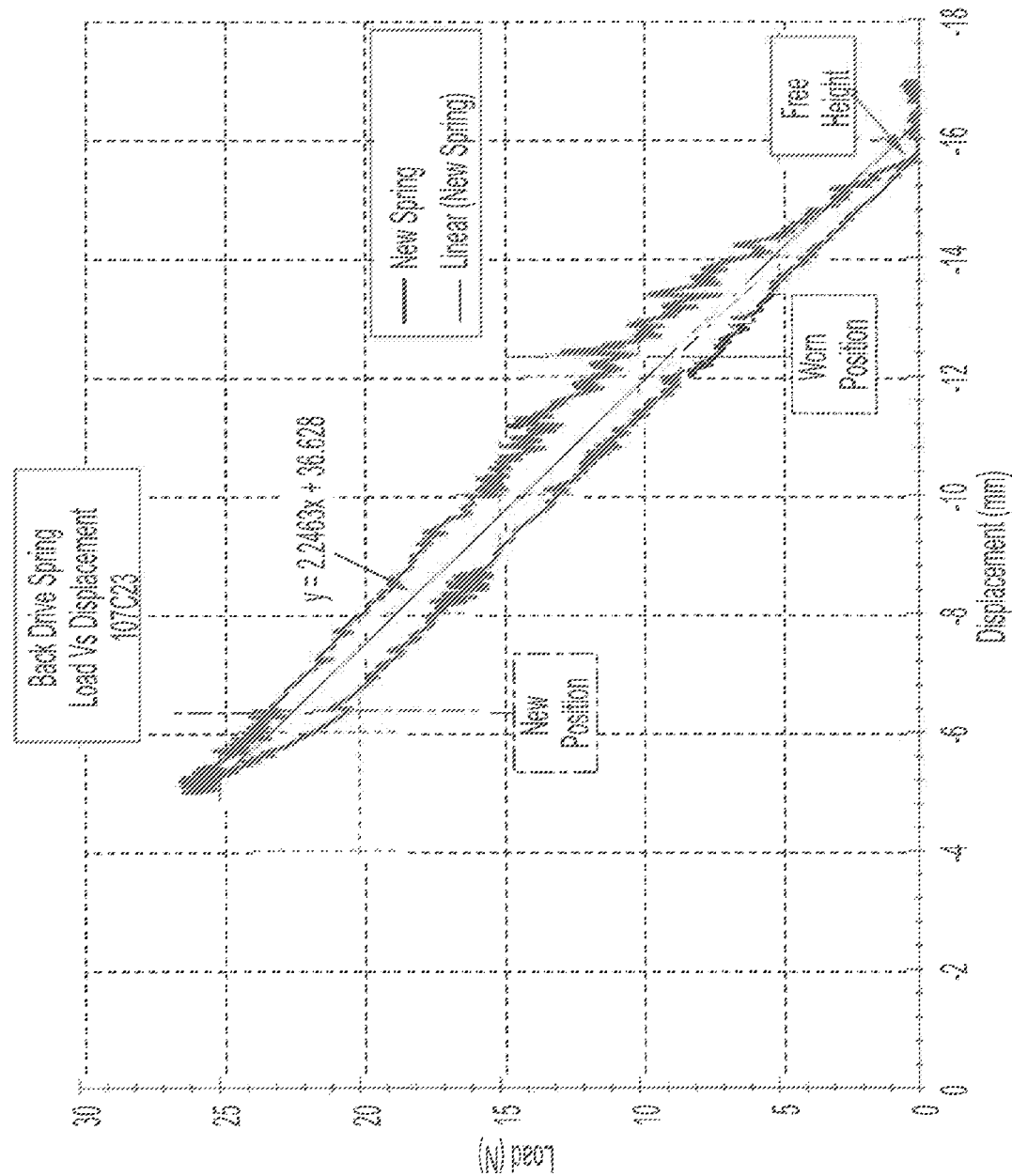

Referring to FIGS. 6A-B, there is shown a prior art back drive prevention assembly 170. The prior art design includes a baffle 162 having cam teeth 172 formed thereon. The cam teeth 172 are not angled or have a zero degree angle and are level on the baffle 162. The forces or load was measured for a back drive spring in both a worn and new state. The displacement of the spring was also measured for a back drive spring in both a worn and new state. A plot of the measurements is provided in FIG. 6B. As can be seen in the diagram, the load at the new position of approximately 23N differs greatly from the load of approximately 8N at the worn position. Additionally, the displacement of the back drive spring between the positions is large at approximately 6 mm.

Figure 7A:
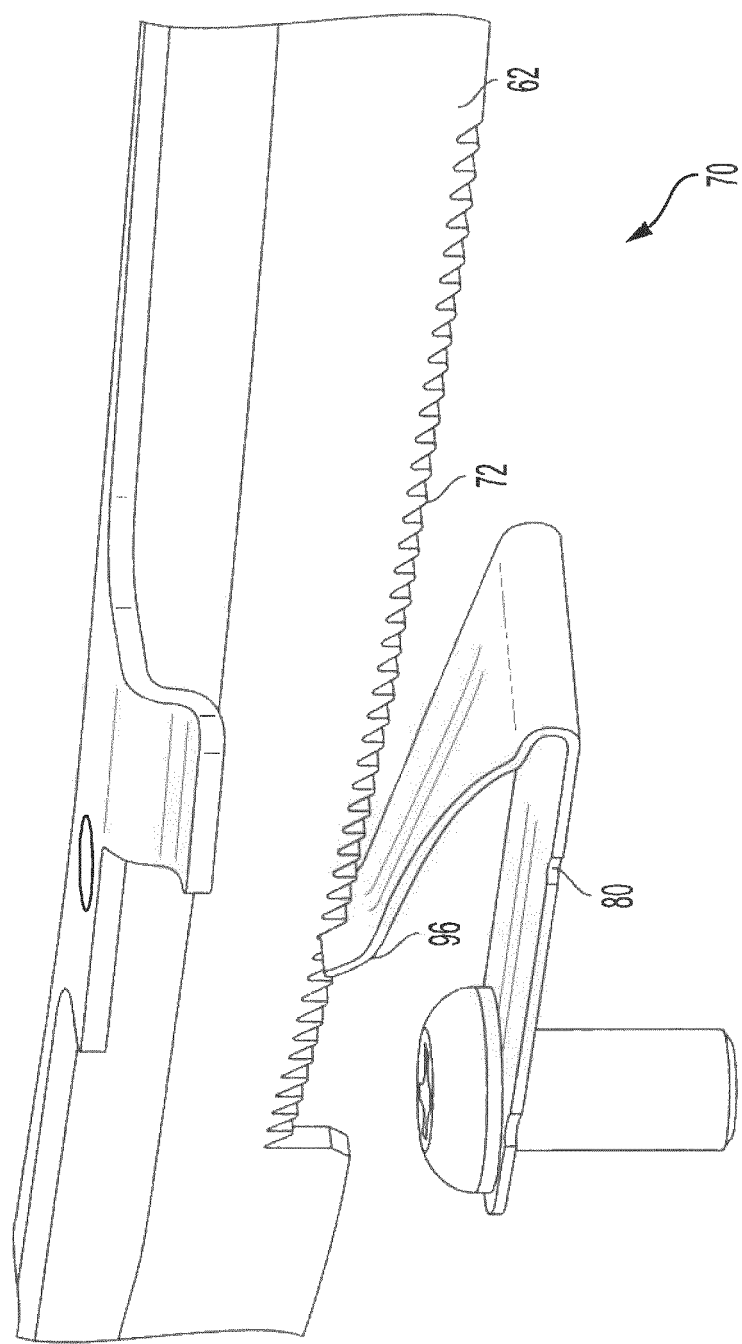
FIG. 7A is a partial perspective view of an improved friction clutch including a baffle and back drive spring and FIG. 7B is a diagram indicating load and displacement of the improved back drive spring.
Figure 7B:
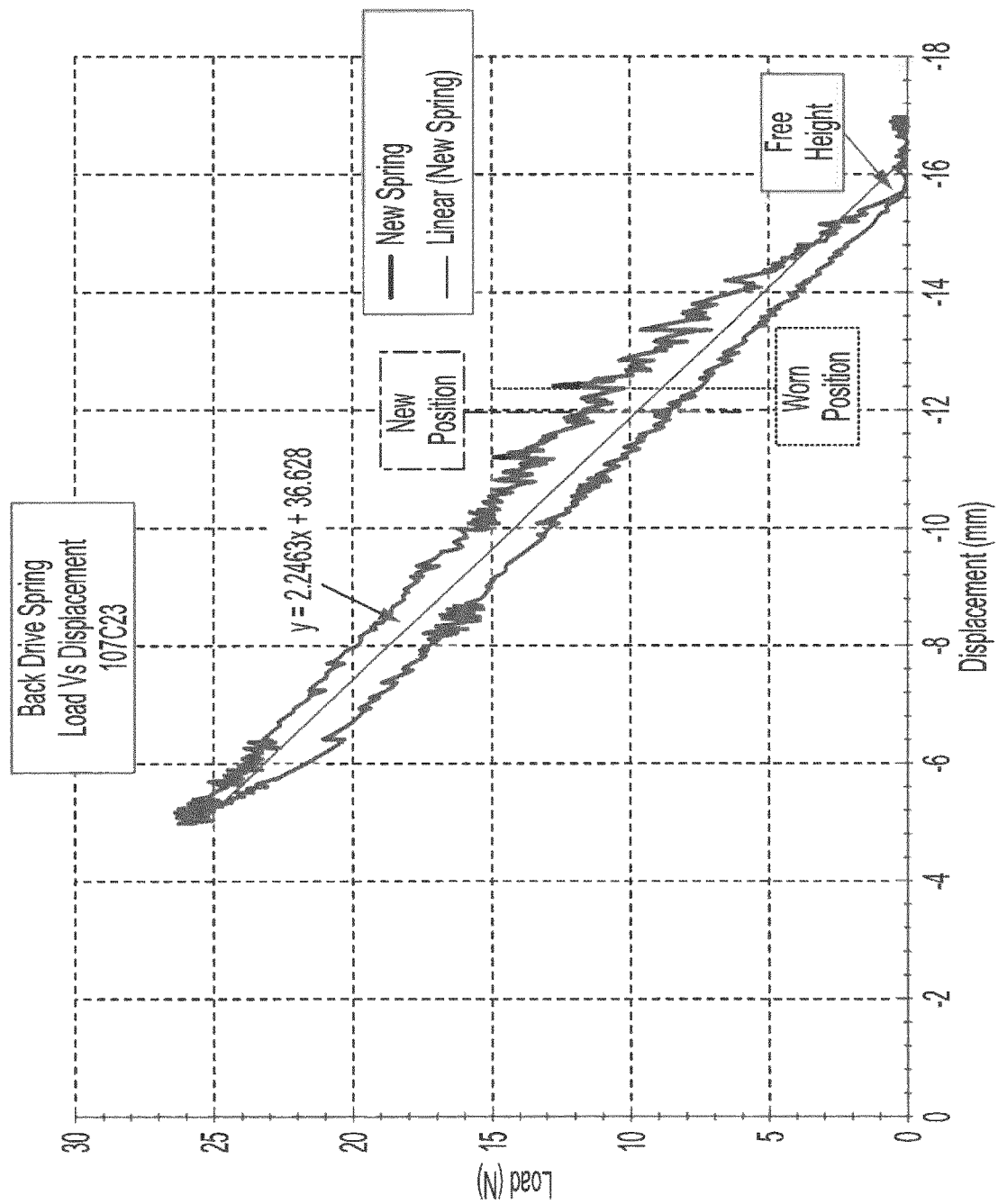

Referring to FIGS. 7A-B, there is shown an improved back drive prevention assembly 70. The design includes a baffle 62 having cam teeth 72 formed thereon. The cam teeth 72 are angled on the baffle 62 as described above at an angle A. In the depicted embodiment the angle A is approximately 2.5 degrees. The forces or load was measured for a back drive spring in both a worn and new state. The displacement of the spring was also measured for a back drive spring in both a worn and new state. A plot of the measurements is provided in FIG. 7B. As can be seen in the diagram, the load at the new position of 10N is similar to the load at the worn position of 9N. The load at the new position of 10N is less than half of the load in the new position of 23N in comparison to the prior art design of FIG. 6B. Additionally, the displacement of the back drive spring between the positions is small at approximately 0.5 mm. This displacement is 12 times less than the displacement of the non-angled version between positions of FIGS. 6A and 6B.

The angled cam teeth 72 reduce the load applied as well as reduces the difference in spring displacement. Reduced loads especially reduce contact stress between the back drive spring 80 and cam teeth 72. This reduction results in a decrease wear applied to the various components of the back drive prevention assembly 70 and improves the performance of the friction clutch.

The invention claimed is:

1. A friction clutch for a motor vehicle coupling an engine flywheel to a transmission comprising:
an adjustment mechanism compensating for wear of a friction disk coupling the engine flywheel and transmission, the adjustment mechanism including: a first cam ring rotatably fixed with respect to a pressure plate, a second cam ring rotatable relative to the first cam ring and both cam rings having a plurality of cam surfaces configured such that rotation of the second cam ring relative to the first cam ring varies a height of the adjustment mechanism, and a torsion spring applying a biasing force to the second cam ring promoting rotation of the second cam ring relative to the first cam ring;
a back drive prevention assembly including a back drive spring attached to the pressure plate and first cam ring to prevent back drive of the second cam ring through a baffle including a plurality of cam teeth formed on a bottom surface of the baffle;
wherein the cam teeth are formed at an angle A relative to a bottom surface of the baffle from a proximal end of the cam teeth to a distal end of the cam teeth decreasing a load applied to the back drive spring and reducing displacement of the back drive spring.

2. The friction clutch of claim 1 wherein the angle A is from 2.0 to 6.0 degrees.

3. The friction clutch of claim 1 wherein the plurality of cam teeth are formed radially about the bottom surface of the baffle in at least one location.

4. The friction clutch of claim 3 wherein the plurality of cam teeth extend from 20 to 40 degrees on the bottom surface of the baffle from a proximal end to a distal end of the plurality of cam teeth.

5. The friction clutch of claim 1 wherein the plurality of cam teeth are formed radially about the bottom surface of the baffle at multiple separated locations.

6. The friction clutch of claim 5 wherein the plurality of cam teeth extend from 20 to 40 degrees on the bottom surface of the baffle at the various locations from the proximal end to the distal end of the plurality of cam teeth.

7. The friction clutch of claim 1 wherein the back drive spring includes a base portion having a slot formed therein for attaching to the second cam ring, the back drive spring including a teeth engaging arm extending from the base at an angle defining a pivot.

8. The friction clutch of claim 7 wherein the teeth engaging arm extends from the base at a side surface of the base and extends along a medial portion to an engagement end that engages the cam teeth.

9. The friction clutch of claim 1 wherein the angle A is from 2.0 to 6.0 degrees and a load of the back drive spring at a new position differs in an amount of 1N from a load of the back drive spring at a worn position.

10. The friction clutch of claim 1 wherein the angle A is from 2.0 to 6.0 degrees and a displacement of the back drive spring at a new position differs in an amount of 0.5 mm from a displacement of the back drive spring at a worn position.

11. A friction clutch for a motor vehicle coupling an engine flywheel to a transmission comprising:
an adjustment mechanism compensating for wear of a friction disk coupling the engine flywheel and transmission, the adjustment mechanism including: a first cam ring rotatably fixed with respect to a pressure plate, a second cam ring rotatable relative to the first cam ring and both cam rings having a plurality of cam surfaces configured such that rotation of the second cam ring relative to the first cam ring varies a height of the adjustment mechanism, and a torsion spring applying a biasing force to the second cam ring promoting rotation of the second cam ring relative to the first cam ring;
a back drive prevention assembly including a back drive spring attached to the pressure plate and first cam ring to prevent back drive of the second cam ring through a baffle including a plurality of cam teeth formed on a bottom surface of the baffle;
wherein the cam teeth are formed at an angle A of from 2.0 to 6.0 degrees relative to a bottom surface of the baffle from a proximal end of the cam teeth to a distal end of the cam teeth decreasing a load applied to the back drive spring and reducing displacement of the back drive spring.

* * * * *